(12) United States Patent
Majima (10) Patent No.: US 6,188,499 B1
(45) Date of Patent: Feb. 13, 2001

(54) WAVELENGTH LOCKING METHOD FOR TUNABLE FILTER, WAVELENGTH LOCKING APPARATUS AND WAVELENGTH DIVISION MULTIPLEXING COMMUNICATION NETWORK USING THE SAME

(75) Inventor: Masao Majima, Isehara (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/076,108

(22) Filed: May 12, 1998

(30) Foreign Application Priority Data

May 14, 1997 (JP) .................................................... 9-139225

(51) Int. Cl.[7] .............................. H40B 10/06; H40J 14/02
(52) U.S. Cl. .......................... 359/193; 359/124; 359/189; 359/187
(58) Field of Search ..................................... 359/124, 154, 359/193, 189, 194, 114, 127, 161, 187

(56) References Cited

U.S. PATENT DOCUMENTS

| | | | |
|---|---|---|---|
| 5,239,400 | * 8/1993 | Liu | 359/125 |
| 5,552,919 | 9/1996 | Majima et al. | 359/161 |
| 5,594,577 | 1/1997 | Majima et al. | 359/124 |
| 5,654,814 | 8/1997 | Ouchi et al. | 359/156 |
| 5,774,243 | 6/1998 | Majima | 359/124 |

FOREIGN PATENT DOCUMENTS 8-163092   6/1996 (JP) .

OTHER PUBLICATIONS

Y. Kotaki, et al., "Long Cavity λ/4 Shifted MQW–DFB Laser with Three Electrodes," Technical Report OQE (Optical and Quantum Electronics) 89–116, Electronics Information Communication Association of Japan, pp 61–66 (1989).

C. Miller, "A Field–Worthy, High Performance, Tunable Fiber Fabry–Perot Filter," Conference Paper ECOC (European Conference on Optical Communication) '90–605 –'90–608 (1990).

C. Miller, et al., "Passively Temperature–Compensated Fibre Fabry–Perot Filter and its Application in Wavelength Division Multiple Access Computer Network," Electronic Letters, vol. 26, No. 25, pp 2122–2123 (Dec. 1990).

T. Kameda, et al., "Heaters on Passive Region Employed (HOPE) DBR–LD," Lecture No. C–149, Electronics Information Communication Association of Japan, 1992 Autumnal Meeting, p. 4–171 (1992).

* cited by examiner

Primary Examiner—Jason Chan
Assistant Examiner—Christina Leung
(74) Attorney, Agent, or Firm—Fitzpatrick, Cella, Harper & Scinto (57) ABSTRACT

In a wavelength locking method, and in an apparatus and a network system using the method, a wavelength of a tunable filter is caused to track a wavelength of light from a light source by controlling a control signal by controlling an operation condition of the tunable filter in a feedback control system of a wavelength locking system. According to the method, an error signal relevant to a deviation of the wavelength of the tunable filter from the wavelength of the light source is generated, an operation signal for feedback control of the wavelength locking system is generated by using the error signal, the operation signal is detected, and a bias component of the control signal is corrected or renewed based on the detected operation signal such that an absolute value of the operation signal does not exceed a predetermined value.

12 Claims, 9 Drawing Sheets

FIG.1A PRIOR ART

STATIONARY STATE

FIG.1B PRIOR ART

START OF OSCILLATION AT λc5

FIG.1C PRIOR ART

STATIONARY STATE

FIG.1D PRIOR ART

END OF OSCILLATION AT λc3

FIG.1E PRIOR ART

STATIONARY STATE

WAVELENGTH LOCKING METHOD FOR TUNABLE FILTER, WAVELENGTH LOCKING APPARATUS AND WAVELENGTH DIVISION MULTIPLEXING COMMUNICATION NETWORK USING THE SAME

BACKGROUND OF THE INVENTION

1. Field of the Invention

The present invention relates to a wavelength locking method of causing a reception wavelength of an optical receiver in wavelength division multiplexing communication networks or the like to track a wavelength of a light source, a wavelength locking apparatus for performing the wavelength locking method, and a wavelength division multiplexing communication network using this apparatus.

2. Related Background Art

Wavelength division multiplexing communication networks generally have a large number of independent channels in a single transmission line. Therefore, in wavelength division multiplexing communication, transmission speeds of the respective channels need not necessarily be equal to each other since multiplexing on a time axis, such as a frame synchronization, is not required. As a result, information different in their qualities, such as video data and audio data, can be collectively treated in a combined manner. Thus, such communications can be suitably employed for multimedia communications for which network flexibility is required.

As an example of the wavelength division multiplexing communication network, there exists a system in which each terminal includes a set of a tunable optical transmitter and a tunable optical receiver. The physical topology of the system is often a star type. Here, each terminal is connected to a star coupler through an optical fiber, and an optical signal from the optical transmitter in each terminal is distributed by the star coupler to the optical receivers in the respective terminals including the transmitting terminal itself. In this state, the transmitting terminal controls a tunable light source in the transmitter such that its wavelength is coincident with a unused wavelength (or a vacant channel), and the receiving terminal controls a peak wavelength of a transmission spectrum of a tunable filter (also referred to as a wavelength of the tunable filter in the specification and claims) in the receiver such that the wavelength becomes equal to the reception wavelength. The receiving terminal thus receives the optical signal. A wavelength range usable in the system is determined by wavelength changeable or tunable ranges of the transmitter and the receiver, and a wavelength spacing between the channels is determined by a width of the transmission spectrum of the tunable filter in the receiver. The wavelength spacing between the channels can be decreased as the width of the transmission spectrum is narrowed.

As the tunable light source in the transmitter, a tunable semiconductor laser (the semiconductor laser is also referred to as LD) can be used. In order for the system to use a wide wavelength range, research has been made to widen a tunable width of the LD. Semiconductor lasers of distributed Bragg reflector (DBR) and distributed feedback (DFB) types are presently used as a practical LD. Their tunable widths are several nanometers or so. As its example, there exists one that is disclosed in "Long Cavity λ/4 Shifted MQW-DFB Laser with Three Electrodes", Technical Report OQE (Optical and Quantum Electronics) 89–116, pp.61–66, Electronics Information Communication Association of Japan.

On the other hand, a filter of a Fabry-Perot cavity type can be used as the tunable filter. The filter with a tunable width of several tens nanometers and a transmission spectrum width of about 0.1 nm is considered as a practical one. As its example, there exists one that is disclosed in "A Field-Worthy, High-Performance, Tunable Fiber Fabry-Perot Filter", Conference Paper ECOC (European Conference on Optical Communication), '90-605, '90-608. The fiber Fabry-Perot filter is also referred to as FFP.

As discussed above, the wavelength range usable in the system is determined by the tunable widths of the transmitter and the receiver, and the wavelength spacing between the channels can be lowered as the spectrum width of the tunable filter is narrowed. In addition, where the wavelength spacing between the channels is small, a larger number of channels can be provided even though the wavelength tunable range, which determines the wavelength range usable in the system, is the same. Here, it should be noted that in order for the wavelength spacing between the channels to be smaller than variation or fluctuation due to wavelength drifts of the tunable LD and the tunable filter, causes of the drifts must be suppressed. For this purpose, wavelength controls of the optical receiver and the optical receiver are performed.

As a wavelength control system of the optical transmitter, there exists a system disclosed in Japanese Patent Application Laid-Open 8-163092. In the system, the transmission wavelength of each optical transmitter is placed at a predetermined wavelength spacing $\Delta \lambda$ on a longer wavelength side (or a shorter wavelength side) along a wavelength axis in the order of start of transmission. A state in which the transmission wavelengths are thus positioned at the predetermined wavelength spacing $\Delta \lambda$ along the wavelength axis, is referred to as a stationary state. Therefore, there is no need of providing an absolute or relative wavelength reference in such a system. Each optical transmitter detects a wavelength spacing between the transmission wavelength itself and its adjacent wavelength on a longer wavelength side, and the transmitter feedback-controls its transmission wavelength based on that detection and maintains the transmission wavelength at a position which attains the predetermined wavelength spacing. The detection of the wavelength spacing is conducted by a wavelength scan of a tunable filter provided in the optical transmitter. The optical transmitter, which emits light at a wavelength placed on the longest wavelength side (or the shortest wavelength side) in the wavelength arrangement, maintains the longest wavelength of the tunable LD in the optical transmitter.

A specific operation of the wavelength control in the optical transmitter will be described with reference to FIGS. 1A–1E. Steps illustrated in FIGS. 1A–1E show a procedure during which a terminal starts transmission, the stationary state is reached, another terminal stops transmission and the stationary state is again reached. In FIGS. 1A–1E, $\lambda_{max}$ and $\lambda_{min}$ are respectively the longest wavelength end and the shortest wavelength end in the usable wavelength range of the wavelength division multiplexing communication system, $\Delta \lambda$ is the wavelength spacing to be maintained by the control, and $\lambda_{mar}$ is a margin for the wavelength setting in the tunable LD and the tunable filter (the margin is needed in the system since no calibration of the absolute value of a wavelength is performed). Due to the margin, the actual usable wavelength range is from $\lambda_{min}+\lambda_{mar}$ to $\lambda_{max}-\lambda_{mar}$.

In the procedure illustrated in FIGS. 1A–1E, it is assumed that four channels (wavelengths $\lambda_{c1}$, $\lambda_{c2}$, $\lambda_{c3}$, and $\lambda_{c4}$) are used before a terminal starts transmission and that the wavelengths are arranged at the spacing of $\Delta \lambda$ starting from $\lambda_{c1}$ on the longer wavelength side. The starting point of $\lambda_{c1}$ has no adjacent wavelength on its longer wavelength side, so the wavelength $\lambda_{c1}$ is at the longest wavelength end in the tunable range of the tunable LD in the optical transmitter that oscillates at this wavelength. However, this wavelength is not always coincident with $\lambda_{max}$ due to the wavelength setting error, and falls within a range from $\lambda_{max}-\lambda_{mar}$ to $\lambda_{max}$ (see FIG. 1A).

Figure 1A:
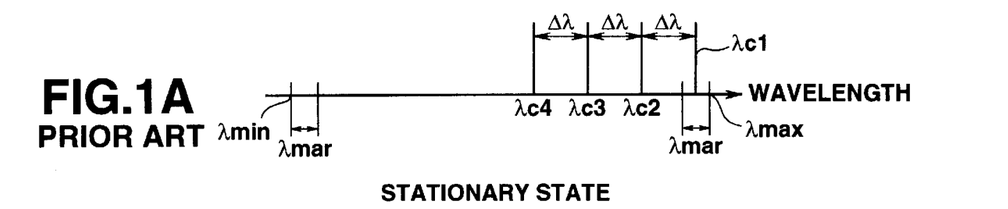
FIGS. 1A to 1E are views illustrating steps of transmission wavelength controls performed by optical transmitters in a conventional wavelength division multiplexing network.
Figure 1B:
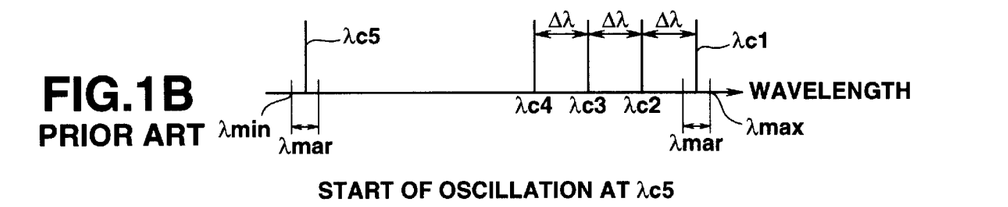
Figure 1C:
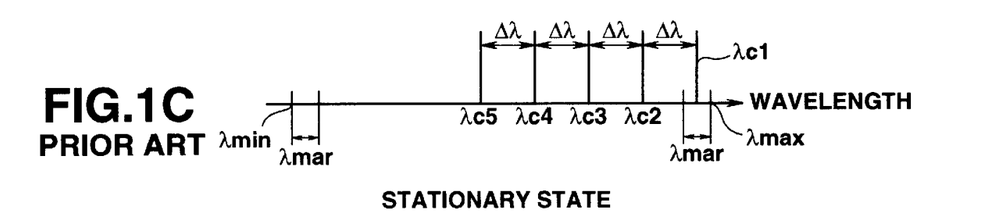

In this state, the terminal, which is going to start emission, starts the emission at the shortest wavelength end after confirming that no other channels are present in a range of $\Delta \lambda$ from the shortest wavelength end (the wavelength is indicated by $\lambda_{c5}$ in FIG. 1B). The wavelength $\lambda_{c5}$ is present in a range from $\lambda_{min}$ to $\lambda_{min}+\lambda_{mar}$ due to the wavelength setting error (see FIG. 1B). The wavelength $\lambda_{c5}$ is shifted toward the longer wavelength side while the terminal confirms no presence of other channels in a range of $\Delta \lambda$ on its longer wavelength side (this step is referred to as an approach step). When the wavelength spacing of $\Delta \lambda$ is reached between $\lambda_{c5}$ and $\Delta_{c4}$, the wavelength spacing is maintaned thereafter. Thus the stationary state is attained (see FIG. 1C).

Figure 1D:
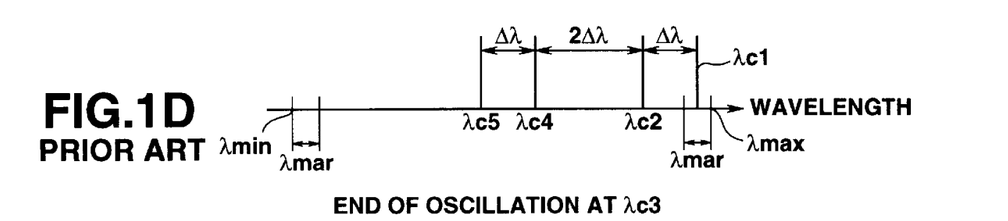
Figure 1E:
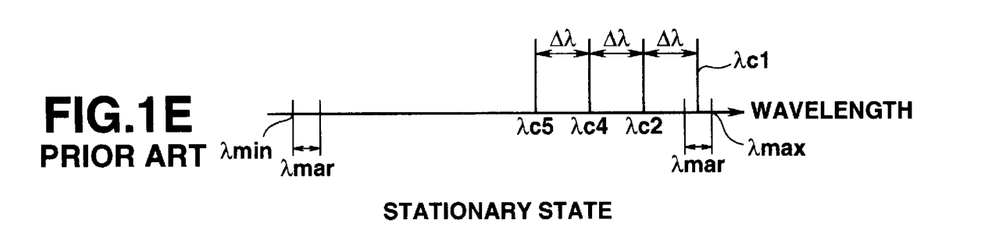

Here, when the terminal which is using the channel of $\lambda_{c3}$, stops oscillation, the wavelength spacing between $\lambda_{c2}$ and $\lambda_{c4}$ comes to $2\times\Delta \lambda$ and the stationary state is thus lost (see FIG. 1D). Then, the wavelengths $\lambda_{c4}$ and $\lambda_{c5}$ are gradually shifted toward the longer wavelength side in the same manner as the above approach step. (Here, each optical transmitter is always monitoring if any other channels are present in a range of $\Delta \lambda$ on its longer wavelength side, for example.) When the wavelength spacing of $\Delta \lambda$ is reached between $\lambda_{c2}$ and $\lambda_{c4}$, the wavelength spacing is maintained thereafter. Thus the stationary state is attained again (see FIG. 1E).

On the other hand, as a wavelength control system in the optical receiver, there is a wavelength locking system or method in which the wavelength of the tunable filter in the optical receiver is locked in or caused to track a selected reception wavelength. The wavelength locking system may perform minute modulation (dither) of the wavelength of the tunable filter and synchronous detection. This locking system will be briefly described.

Figure 2:
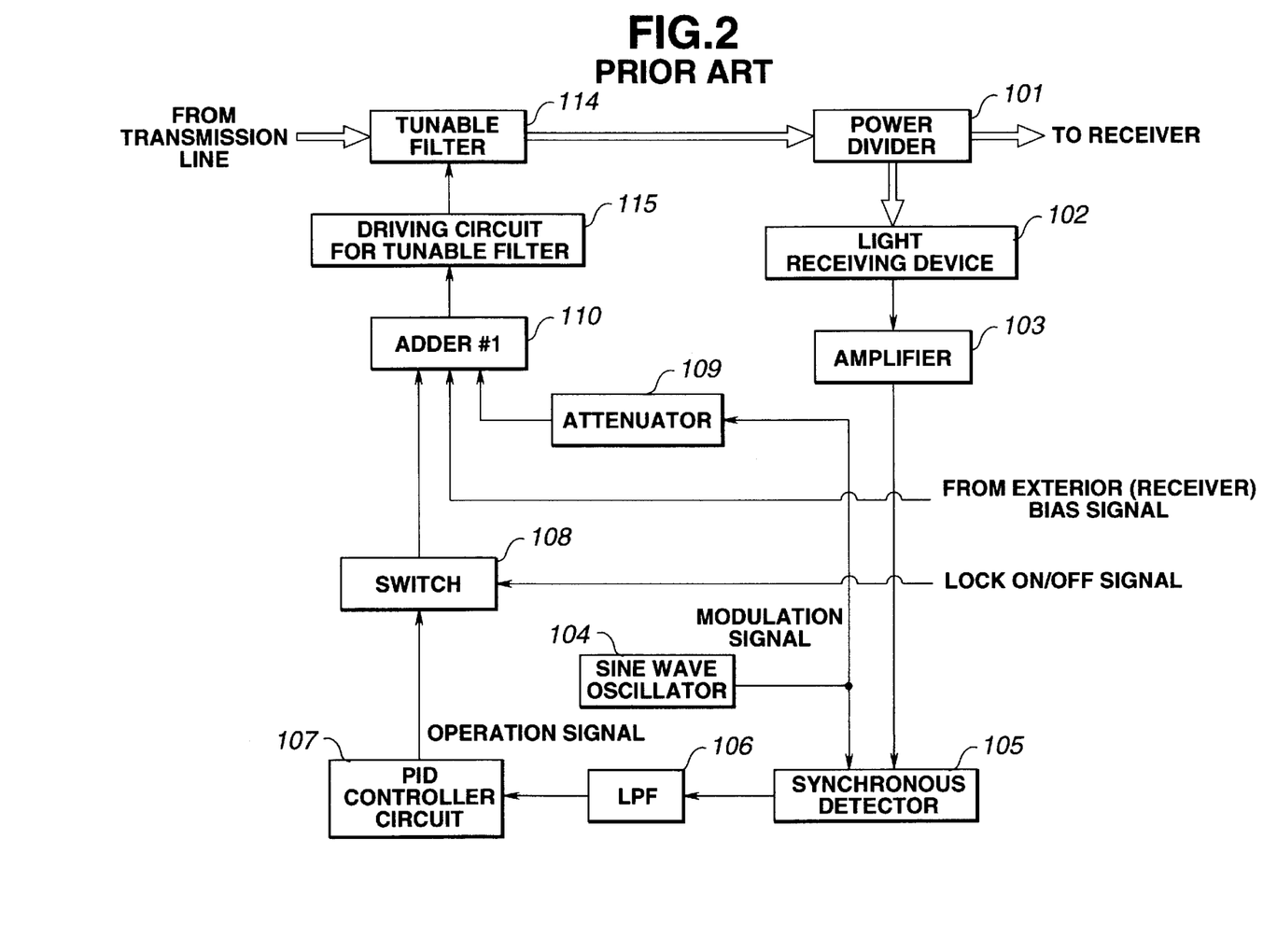
FIG. 2 is a view illustrating the structure of a prior art wavelength locking system for locking a wavelength of a tunable filter in a reception wavelength from an optical transmitter.

FIG. 2 shows the structure of a prior art wavelength locking system. The locking system includes an optical power divider 101, a light receiving device 102, an amplifier 103, a sine wave generator 104, a synchronous detector 105, a low pass filter (LPF) 106, a PID (proportional plus integral plus derivative) controller circuit 107, a switch 108, an attenuator 109, an adder #1 (110), a tunable filter 114, and a driving circuit 115 for driving the tunable filter 114.

The principle of the wavelength locking is as follows. A sine wave from the sine wave generator 104 is superimposed on a driving signal for the tunable filter 114, so that the wavelength of the tunable filter 114 is minutely modulated in accordance with the sine wave. In this state, when a slope of the transmission spectrum of the tunable filter 114 is accorded to the reception wavelength by controlling a bias signal from the exterior (a receiver), an intensity of light transmitted through the tunable filter 114 comes to contain the sine wave as a signal component.

The relationship between phases of the sine wave component of the transmitted light intensity and the sine wave of the sine wave generator 104 changes depending on the positional relationship between the wavelength of the tunable filter 114 and the reception wavelength. For example, where it is assumed that there are no elements that invert the signal in the wavelength locking system, the phase relationship between those two signals is in-phase (the same phase) when the wavelength of the tunable filter 114 is on a shorter wavelength side of the reception wavelength. The phase relationship between those two signals is anti-phase (a reverse phase) when the wavelength of the tunable filter 114 is on a longer wavelength side of the reception wavelength. An output of the synchronous detector 105 is positive (plus) when those two input signals are in the in-phase relationship, and the output of the synchronous detector 105 is negative (minus) when those two input signals are in the anti-phase relationship. In order for a low-frequency component of the output signal from the synchronous detector 105 (the low-frequency component is obtained by the LPF 106) to be equal to 0 (zero), the PID controller circuit 107 performs feedback control by adjusting an operation signal (its output) for the driving circuit 115. Thus the wavelength of the tunable filter 114 can be locked at the reception wavelength.

For wavelength locking, it is initially necessary that the wavelength of the tunable filter 114 is set close to the reception wavelength. This operation is conducted by adjusting the bias signal from the exterior (the receiver) under the condition under which the feedback control using the operation signal is stopped by switching a lock ON/OFF signal from the exterior to OFF. After completing this adjustment, the lock ON/OFF signal is switched to ON, and the above-discussed wavelength locking operation is performed.

Such a wavelength locking system is disclosed in "Passively Temperature-Compensated Fiber Fabry-Perot Filter And Its Application In Wavelength Division Multiple Access Computer Network", Electronics Letters, vol. 26, No. 25, pp 2122–2123.

The above-discussed prior art wavelength locking system in the optical receiver has, however, the following disadvantage. In the wavelength control system of the optical transmitter, the wavelength of the transmitter is largely varied by the approach operation even during the signal transmission period. Therefore, the wavelength of the tunable filter 114 in the optical receiver is also changed during the wavelength locking operation. In the prior art wavelength locking system, the wavelength of the tunable filter 114 after being locked is shifted by the operation signal supplied from the feedback control system including the synchronous detector 105, the PID controller circuit 107 and so forth. Hence, an increase in a gain of the feedback control system and expansion of an output range of the operation signal are needed to increase the amount of the wavelength shift of the tunable filter 114 after being locked.

Figure 3:
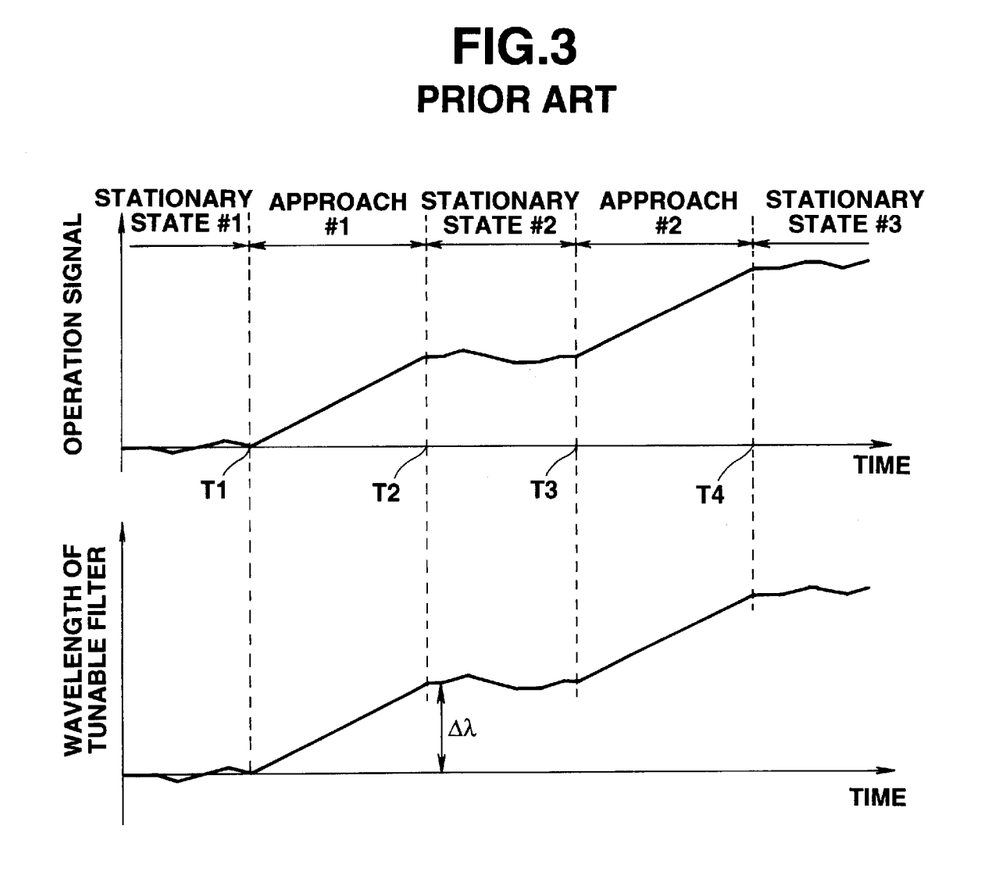
FIG. 3 is a view illustrating the wavelength control operation of the prior art wavelength locking system.

FIG. 3 illustrates the above situation. This is an example in which the system disclosed in the above-described Japanese Patent Application Laid-Open 8-163092 is used as the wavelength control system of the optical receiver. In FIG. 3, there are two approach periods #1 and #2 between stationary state periods #1 and #2. Changes over time of the operation signal and the wavelength of the tunable filter during those periods are shown. The operation signal increases as the wavelength of the tunable filter goes up.

In the feedback control system, however, the magnitude of the gain has a relationship of trade-off with control precision or accuracy, and the expansion of the output range of the operation signal inevitably leads to an increase in probability of losing the locking and a hindrance to improvement in response characteristics.

SUMMARY OF THE INVENTION

An object of the present invention is to provide a wavelength locking method for locking the wavelength of a tunable filter in the wavelength of light from a light source, which is capable of increasing a wavelength shift of the tunable filter subsequent to the wavelength locking without lowering wavelength locking performances such as control precision or accuracy, locking operation stability and response characteristics. It is also an object of the present invention to provide a wavelength locking apparatus and an optical communication system using the wavelength locking method.

The present invention is generally directed to a wavelength locking method for causing a wavelength of a transmission spectrum of a tunable filter (such as a FFP and a filter with a DFB or DBR type semiconductor laser structure) to track a wavelength of light from a light source by controlling a control signal by controlling an operation condition of the tunable filter in a feedback control system of a wavelength locking system, in which an error signal relevant to a deviation of the wavelength of the tunable filter from the wavelength of the light source is generated, an operation signal for the feedback control is generated by using the error signal, the operation signal is detected, and a bias component of the control signal for the filter driving circuit is corrected or renewed based on the detected operation signal such that an absolute value of the operation signal does not exceed a predetermined value (V1). Thereby, wavelength locking range can be expanded while maintaining preferable performances of the wavelength locking system.

Specifically, the following processings are possible: The wavelength of the transmission spectrum of the tunable filter may be caused to track the wavelength of the light source by controlling the control signal for controlling at least one of a voltage application condition, a current injection condition, and a temperature condition of the tunable filter.

In the bias component correcting step, the bias component of the control signal may be corrected such that the absolute value of the operation signal is reduced to a value no more than V1 (e.g., 0 (zero)) when the absolute value of the operation signal reaches V1 or more.

In the bias component correcting step, the bias component of the control signal may be increased or decreased by a given value such that the absolute value of the operation signal is maintained at a value no more than V1 when the absolute value of the operation signal reaches V1 or more. Since there is no need to correct the bias component while monitoring a change of the operation signal, the bias correcting processing can be readily performed.

According to another aspect of the present invention, there is provided a wavelength locking apparatus for causing a wavelength of a transmission spectrum of a tunable filter to track a wavelength of light from a light source by controlling a control signal by controlling an operation condition of the tunable filter in its feedback control system, in which there are arranged a unit for generating an error signal relevant to a deviation of the wavelength of the tunable filter from the wavelength of the light source, a unit for generating an operation signal for feedback control using the error signal, a unit for detecting the operation signal, and a unit for correcting a bias component of the control signal for the filter driving circuit based on the detected operation signal such that an absolute value of the operation signal does not exceed a predetermined value (V1).

Specifically, the following structures are possible: The bias component correcting unit may be arranged separately from a control unit for controlling the entire wavelength locking apparatus (which switches on or off the wavelength locking control, brings the operation condition of the tunable filter to a condition under which the wavelength locking control can be started, or the like). In this case, burden of the processing by the control unit for controlling the entire wavelength locking apparatus can be eased.

The control unit may include the bias component correcting means as well. In this case, no additional structural elements need be added to the feedback control system in the wavelength locking apparatus.

According to yet another aspect of the present invention, there is provided a wavelength division multiplexing communication network including an optical transmitter, and an optical receiver with a tunable filter for receiving light transmitted from the optical transmitter through a transmission medium, in which a wavelength of the tunable filter is caused to track a wavelength of the light from the optical transmitter by controlling a control signa by controlling an operation condition of the tunable filter in a feedback control of a wavelength locking system when the wavelength of the light from the transmitter changes during communication, and the wavelength tracking is performed by the above wavelength locking method. Thereby, a wavelength spacing between channels can be narrowed and a shift speed of the wavelength of the light from the transmitter can be increased.

These advantages and others will be more readily understood in connection with the following detailed description of the preferred embodiments in conjunction with the drawings.

DESCRIPTION OF THE PREFERRED EMBODIMENTS

First Embodiment

In the present invention, a large shift of the reception wavelength after the start of the wavelength locking is performed by correcting or renewing a bias component of the control signal for the filter driving circuit. In a first embodiment of the present invention, its wavelength locking system is provided with a bias correcting circuit using a digital control. The first embodiment will be described with reference to FIGS. 4, 5 and 6, in which substantially the same elements as those in FIG. 2 are indicated by the same numerals.

Figure 4:
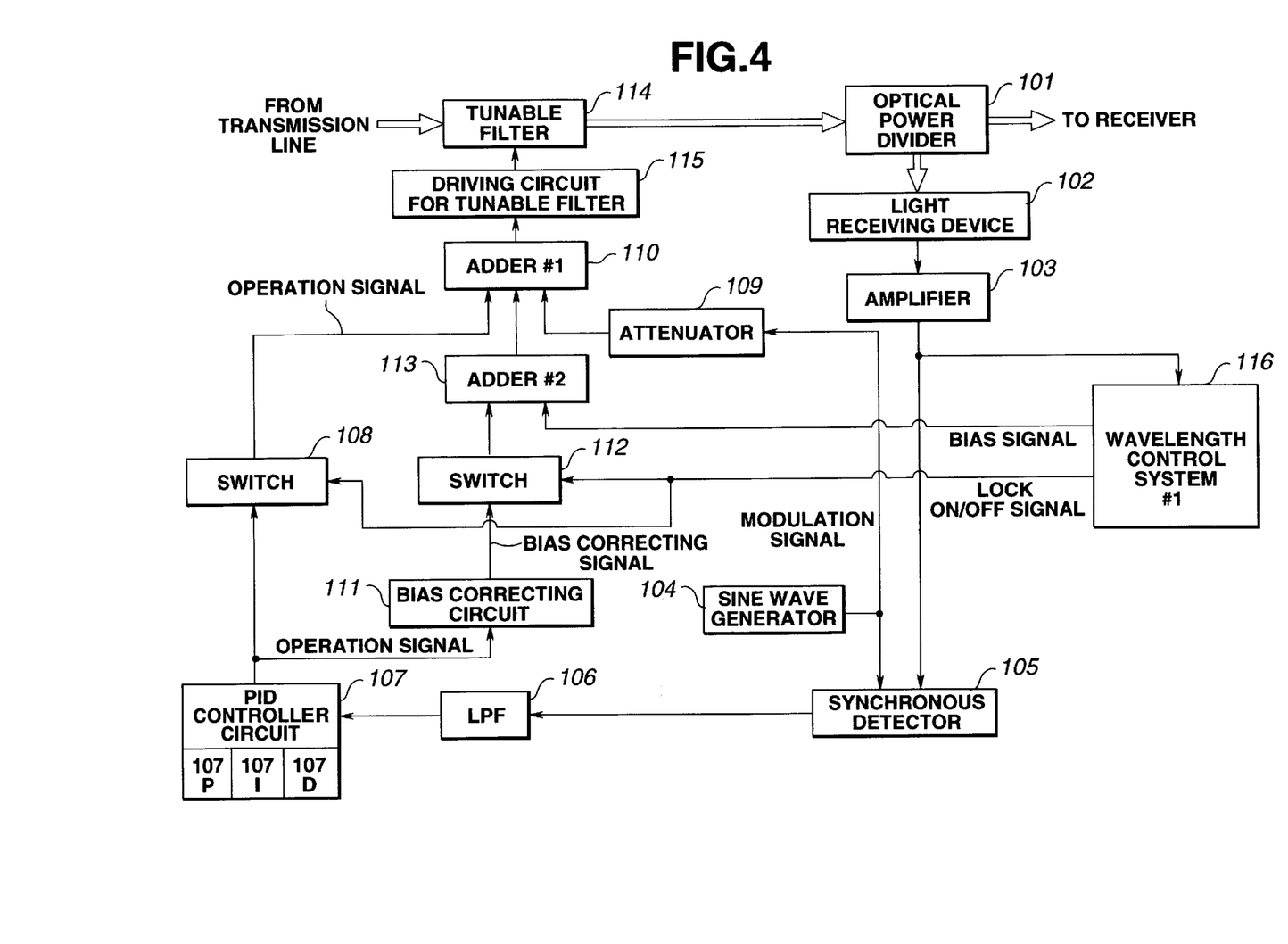
FIG. 4 is a view illustrating the structure of a first embodiment of a wavelength locking system according to the present invention.

FIG. 4 illustrates the structure of the first embodiment of the wavelength locking system according to the present invention. The wavelength locking system includes an optical power divider 101, a light receiving device 102, an amplifier 103, a sine wave generator 104, a synchronous (or phase) detector 105, a low pass filter (LPF) 106, a PID controller circuit 107, switches 108 and 112, an attenuator 109, an adder #1 (110), a bias correcting circuit 111, an adder #2 (113), a tunable filter 114, a driving circuit 115 for driving the tunable filter 114 and a wavelength control system #1 (116).

The divider 101 divides light transmitted through the tunable filter 114 into light guided to the receiver and light guided to the wavelength locking system. The light receiving device 102 converts an optical signal from the divider 101 into an electric signal. The amplifier 103 amplifies the electric signal. The sine wave generator 104 generates a modulation signal for wavelength locking. The modulation signal preferably has a frequency in the order of kilohertz (kHz) when the above-mentioned FFP is used as the tunable filter 114. Upper limits of bands of the light receiving device 102 and the amplifier 103 are set in a range above the frequency of the sine wave and below several tenths of the transmission speed of the signal. (The order of kHz to the order of MHz is preferably used.)

The synchronous detector 105 compares the phase of the signal from the amplifier 103 to the phase of the signal from the sine wave generator 104. The synchronous detector 105 outputs a positive signal when those phases are in an in-phase relation, and a negative signal when those phases are in an anti-phase relation. There are several methods in the phase comparison, such as a method using a multiplier and a method wherein one of those inputs is used as a gate signal and the other is ON-OFFed thereby. Thus, an error signal (a signal corresponding to the deviation of the wavelength of the tunable filter 114 from the wavelength of the reception light) is generated in the wavelength locking system using the modulation and the synchronous detection. A cut-off frequency of the LPF 106 is normally set below one-tenth the frequency of the sine wave of the imodulation signal.

The PID controller circuit 107 consists of a proportional element 107 P, an integral element 107 I, and a derivative element 107 D, and achieves a feedback control whose settling time (time for stabilizing the locking operation) is short and whose deviation (a difference between an actually-reached point and a target point) is small. The PID controller circuit 107 generates the operation signal based on the error signal input thereinto from the LPF 106. Values of the respective control elements 107 P, 107 I and 107 D are optimized for an object to be controlled (in this case, the locking system for locking the wavelength of the FFP in the wavelength of the LD light source).

The switch 108 switches on or off the input of the operation signal from the PID controller circuit 107 to the adder #1 (110). In the OFF state, the input of the switch 108 is opened and its output is connected to ground. The ON/OFF control of the switch 108 is performed by the wavelength control system #1 (116).

Figure 5:
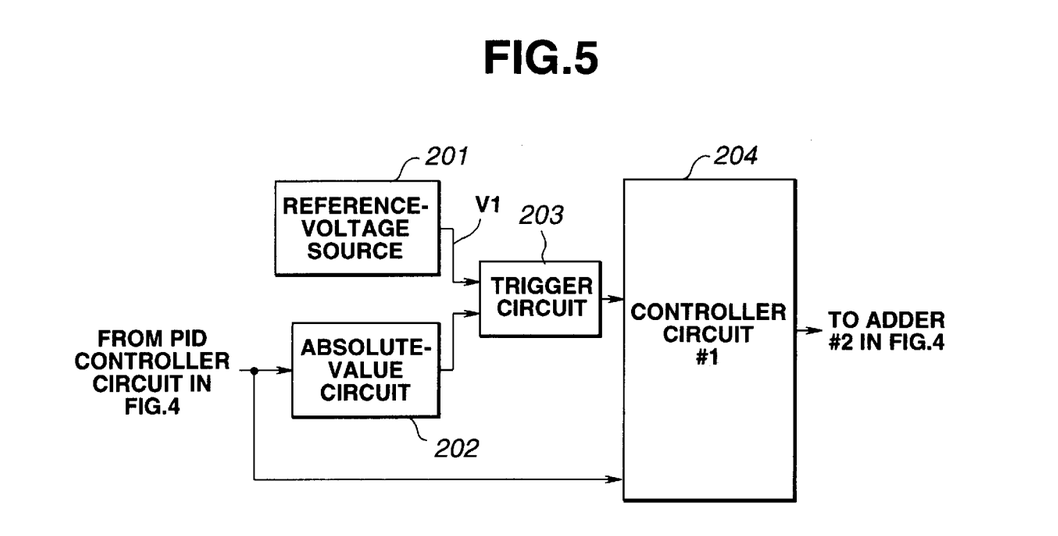
FIG. 5 is a view illustrating the structure of a bias correcting circuit used in the first embodiment.

The attenuator 109 attenuates the amplitude of the modulation signal from the sine wave generator 104. The attenuation is carried out for diminishing the amplitude of the wavelength modulation of the tunable filter 113. The bias correcting circuit 111 generates the bias correcting signal based on the operation signal input thereinto. The structure of the bias correcting circuit 111 is illustrated in FIG. 5, and will be described in more detail below. The adder #1 (110) adds three input signals. One of the three signals is the operation signal from the switch 108, another signal is a signal from the adder #2 (113) and the other signal is the modulation signal from the attenuator 109.

The switch 112 switches on or off the input of the bias correcting signal from the bias correcting circuit 111 to the adder #2 (113). In the OFF state, the input of the switch 112 is opened and its output is connected to ground (GND). The ON/OFF control of the switch 112 is also performed by the wavelength control system #1 (116). The adder #2 (113) adds up two input signals. One of the two signals is the bias correcting signal from the switch 112, and the other signal is the bias signal from the wavelength control system #1 (116).

As the tunable filter 114, the above-described FFP is preferably used. The driving circuit 115 for the tunable filter 114 is a voltage source of a voltage control type. The signal from the adder #1 (110) in the wavelength locking system is input into the driving circuit 115, and the driving circuit 115 outputs a voltage signal, proportional to the signal from the adder #1 (110), to the tunable filter 114.

The wavelength control system #1 (116) controls the operation of the wavelength locking control system, and includes a CPU, a memory, digital input and output, analog input and output, and so forth. The wavelength control system #1 (116) can also be constructed by using a one-chip microcomputer formed by integrating those elements on a single chip. In the memory, there are stored the amount of a change of an electric control signal needed for a predetermined shift of the transmission wavelength of the tunable filter 114, an operation procedure and timings for performing a wavelength locking operation later described, and the like. The signal from the amplifier 103 in the wavelength locking system is input into the analog input of the wavelength control system #1 (116), and the system #1 (116) uses this signal for selection of the reception wavelength and setting of an initial wavelength thereof at the start time of the wavelength locking. Digital outputs of the wavelength control system #1 (116) are supplied to the switches 108 and 112 as the lock ON/OFF signal. The analog output is supplied to the adder #2 (113) as the bias signal.

FIG. 5 illustrates the structure of the bias correcting circuit 111. The circuit 111 is comprised of a reference-voltage source 201, an absolute-value circuit 202, a trigger circuit 203, and a controller circuit #1 (204). The reference-voltage source 201 supplies a reference voltage V1 of the operation signal for the bias correcting circuit 111 to start the bias correction. The absolute-value circuit 202 receives the operation signal from the PID controller circuit 107 in the wavelength locking control system, and outputs its absolute value.

The trigger circuit 203 has two analog inputs and one digital output. The absolute value of the operation signal from the absolute-value circuit 202 and the reference voltage V1 from the reference-voltage source 201 are supplied to the analog inputs of the trigger circuit 203, and the trigger circuit 203 outputs a trigger signal through its digital output when the absolute value of a voltage of the operation signal exceeds the value of the reference voltage V1.

The controller circuit #1 (204) is comprised of one-chip microcomputer programmed such that the following operation is performed, and provided with a digital input, analog input and output, and so forth. In the controller circuit #1 (204), the trigger signal from the trigger circuit 203 is supplied through the digital input, and the operation signal from the PID controller circuit 107 in the wavelength locking system is supplied through the analog input, so that the polarity of the operation signal and the absolute value thereof are detected by the controller circuit #1 (204). The analog output of the controller circuit #1 (204) is supplied to the switch 112 in the wavelength locking system as the bias correcting signal. Upon input of the trigger signal, the controller circuit #1 (204) increases or decreases the bias correcting signal such that the operation signal of the analog input is reduced to 0 (zero). When the operation signal is positive, the bias correcting signal is increased, while when the operation signal is negative, the bias correcting signal is decreased. After the operation signal is reduced to zero, the analog signal is maintained until a next trigger signal is input into the controller circuit #1 (204).

Figure 6:
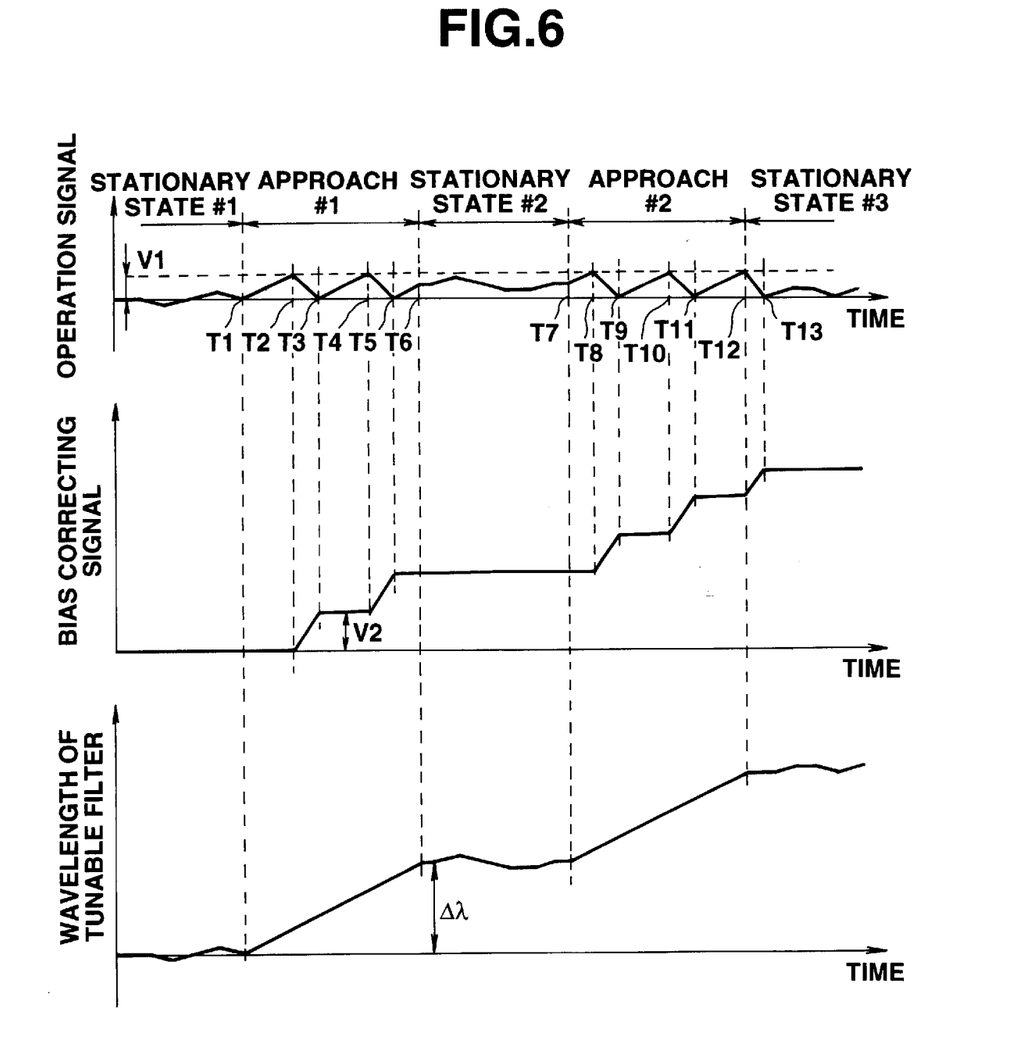
FIG. 6 is a view illustrating the wavelength control operation of the first embodiment.

FIG. 6 shows the operation of the wavelength locking system of this embodiment. In FIG. 6, changes with time of the operation signal, the bias correcting signal and the wavelength of the tunable filter 114 are illustrated. Here, an operation example of the network, to which the above-discussed control system of controlling the wavelength of the optical transmitter is applied, is illustrated. The wavelength of the optical transmitter received by the receiving system (this wavelength is also referred to as the reception wavelength in which the wavelength of tunable filter 114 is locked by the wavelength locking system) is goes through two approach periods during the procedure shown in FIG. 6. The procedure includes a stationary state period #1 (the reception wavelength is not largely shifted but adjusted minutely), an approach period #1 (the reception wavelength is greatly shifted), a stationary state period #2, an approach period #2 and a stationary state period #3 in this order. In FIG. 6, times T1, T6, T7 and T12 indicate timings at each of which the operation of the reception wavelength changes, and times T2, T3, T4, T5, T8, T9, T10, T11 and T13 indicate timings of the bias correcting operation.

The operation will be described with reference to those figures. The operation of the wavelength locking control system is controlled by the wavelength control system #1 (116). In this embodiment, the bias correcting mechanism is added to the above-discussed conventional wavelength locking system. Initially, an ordinary wavelength locking operation will be described.

Operation prior to start of wavelength locking

The wavelength control system #1 (116) outputs the OFF signals of the lock ON/OFF signal into the switches 108 and 112 to bring these switches to the OFF state. The wavelength of the tunable filter 114 is controlled solely by the bias signal from the wavelength control system #1 (116). In the structure of FIG. 4, though the minute modulation signal of the sine wave generator 104 is also superimposed on the bias signal, the modulation signal may also be switched off. At any rate, the minute modulation signal is not important during the current operation. The wavelength control system #1 (116) adjusts the bias signal while monitoring the output of the amplifier 103, and brings the wavelength of the tunable filter 114 close to the reception wavelength. Steps up to this step can be performed in various ways depending on how the exchange with the transmitter side which is going to start the transmission is to be made, but those steps are not critical to the present invention. Therefore, the description will be made on the assumption that the wavelength of the tunable filter 114 has been brought close to the reception wavelength.

Operation immediately after start of wavelength locking

The wavelength control system #1 (116) outputs the ON signals of the lock ON/OFF signal to the switches 108 and 112 to bring these switches to the ON state. Thereupon, wavelength locking control is started, and the deviation of the wavelength of the tunable filter 114 from the reception wavelength is detected. Based on the detection of the deviation, the wavelength of the tunable filter 114 is caused to track the reception wavelength using the operation signal, and the wavelength of the tunable filter 114 is locked in the reception wavelength. This operation is fundamentally the same as the operation of the above-discussed conventional apparatus.

Next, the bias correcting operation, which is a specific feature of the present invention, will be described, using the example illustrated in FIG. 6. The operation of the reception wavelength transmitted from the transmitter side changes in the following order:

the stationary state period #1 up to time T1,
the approach period #1 from time T1 to time T6,
the stationary state period #2 from time T6 to time T7,
the approach period #2 from time T7 to time T12, and
the stationary state period #3 from time T12.

During the stationary state period #1, a fluctuation amount of the reception wavelength is small, and hence the absolute value of the operation signal in the wavelength locking control system is below V1. Therefore, the wavelength locking is conducted solely by the operation signal.

During the approach period #1, the reception wavelength shifts toward the longer wavelength side, and the wavelength fluctuation amount is large ($\Delta \lambda$ is 10 GHz, for example). As a result, the operation signal of the wavelength locking control system comes to exceed V1 in this period, and then the bias correcting operation is performed. In this case, the operation signal reaches V1 at T2 due to the shift of the reception wavelength during the period from T1 to T2. Here, V1 is the magnitude of the operation signal at which the bias correcting operation is to be started, and this magnitude is given by the reference voltage source 201 in the bias correcting circuit 111. The bias correcting signal is maintained at a constant value up to time T2.

When the operation signal reaches V1, the trigger circuit 203 in the bias correcting circuit 111 generates the trigger signal and the controller circuit #1 (204) thereupon begins to lift its output of the bias correcting signal. In this case, since the operation signal of V1 is positive, the bias correcting signal is increased. The controller circuit #1 (204) monitors the operation signal from the PID controller circuit 107 even during the increase period of the bias correcting signal, and stops the increase of the bias correcting signal at time T3, at which the operation signal reaches 0 (zero), maintaining this value of the bias correcting signal at time T3.

The period from time T2 to time T3 is a cycle of a single bias correcting operation. An increment (V2 in FIG. 6) of the bias correcting signal during one bias correcting operation has a value which is obtained by adding V1 (an amount for reducing the operation signal, which has reached zero, to zero) to an increment of the operation signal due to the shift of the reception wavelength during the bias correcting operation period from T2 to T3. For example, where the period between T2 and T3 is half the period between T1 and T2, the shift of the reception wavelength during the correcting operation period from T2 to T3 is equal to half the wavelength shift during the period between T1 and T2. Therefore, the increment of the operation signal due to that wavelength shift is 0.5×V1, and hence V2 is equal to 1.5×V1. Here, it is assumed that a wavelength shift speed during the approach period of the reception wavelength is constant.

A similar bias correcting operation is also performed during the period between T4 and T5. Since during the period between T5 and T6, the shift of the reception wavelength from the transmitter side is stopped before the operation signal reaches V1, the value of the bias correcting signal at time T5 is maintained.

During the stationary state period #2, the fluctuation amount of the reception wavelength is small and the operation signal of the wavelength locking control system is below V1. Therefore, the bias correcting signal is maintained at a constant value, and the wavelength locking control is performed solely by the operation signal from the PID controller circuit 107.

During the approach period #2, the same bias correcting operation as that during the approach period #1 is performed. The approach period #2 differs from the approach period #1 in that the operation signal at the operation start time T7 is not 0 (zero) and the operation signal reaches Vi at the operation stop time T12.

During the stationary state period #3, since the operation signal is V1 at the start time point T12, the bias correcting operation is initially performed. The bias correcting signal is increased in the bias correcting circuit 111, and the operation signal is, as a result, brought close to zero. The operation signal reaches 0 (zero) at time T13, and thus the bias correcting operation is finished. A portion thereafter is the same as the stationary state periods #1 and #2.

Even during the stationary state period, when the operation signal reaches V1 due to a minute change of the reception wavelength, the bias correcting operation is executed and the operation signal is brought to zero. The value of V1 defines a maximum value of the operation signal in the wavelength locking control system. This value is preferably approximately equal to a maximum operation signal (the order of 100 mV to the order of 1 V, for example) in a normal wavelength locking control system, by which the wavelength is not largely shifted (for example, up to a value several times as large as a half width of the transmission spectrum of the tunable filter).

As described above, the wavelength of the tunable filter 114 can be locked in at the reception wavelength by the bias correcting operation, in spite of a large shift of the reception wavelength, with the operation signal being retained below V1. In the above approach period, the operation signal reaches V1 of a positive value since the reception wavelength is always increased. However, where the reception wavelength is decreased and the operation signal reaches V1 of a negative value, the above-described bias correcting circuit 111 detects such situation and reduces the bias correcting signal to bring the absolute value of the operation signal to 0 (zero).

In this embodiment, the bias correcting operation is performed by the bias correcting circuit in the wavelength locking control system, so that no large burden is given to the structure of the wavelength control system for controlling the entire wavelength control system.

Second Embodiment

In a second embodiment, there is arranged a bias correcting circuit using the digital control in the wavelength locking system, similar to the first embodiment. However, the structure of the bias correcting circuit is different from that of the first embodiment, and accordingly the bias correcting operation is also different. Those differences will be described with reference to FIGS. 7 and 8. The structure of the wavelength locking system of the second embodiment is the same as that of the first embodiment, so its description is omitted.

Figure 7:
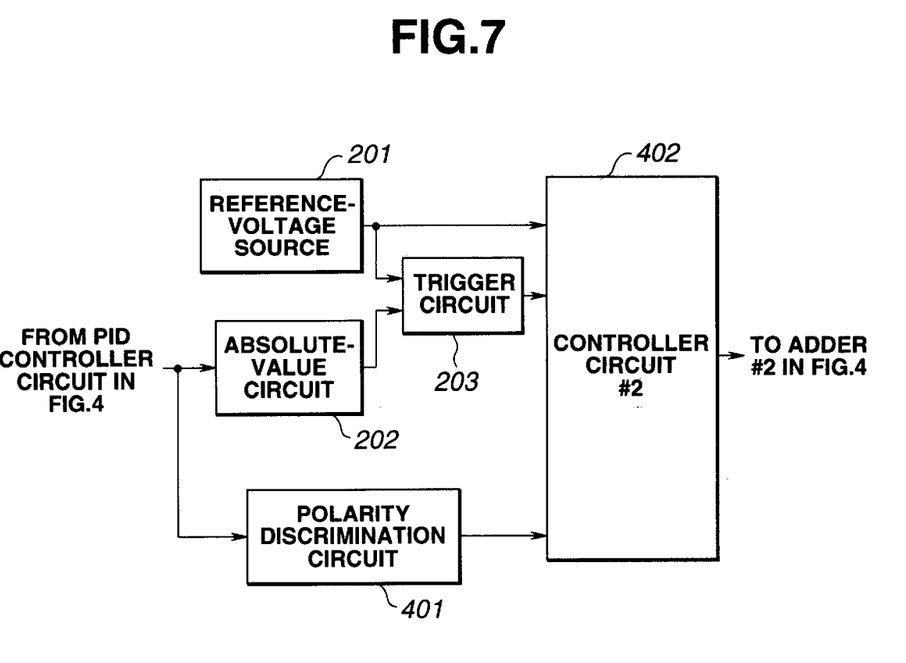
FIG. 7 is a view illustrating the structure of a bias correcting circuit used in a second embodiment of a wavelength locking system according to the present invention.

FIG. 7 illustrates the structure of a bias correcting circuit 111 of this embodiment. The bias correcting circuit 111 includes a reference-voltage source 201, an absolute-value circuit 202, a trigger circuit 203, a polarity discrimination circuit 401, and a controller circuit #2 (401). The reference-voltage source 201, the absolute-value circuit 202 and the trigger circuit 203 are the same as those of the first embodiment illustrated in FIG. 5, so their explanations are omitted.

The polarity discrimination circuit 401 discriminates the polarity of the operation signal input from the PID controller circuit 107 in the wavelength locking control system, and outputs a polarity discrimination digital signal based on the discrimination. Therefore, different from the first embodiment, the operation signal from the PID controller circuit 107 is not input directly into the controller circuit #2 (402). Here, it is assumed that the polarity discrimination signal is "H" when the polarity of the input analog signal of the operation signal is positive, while it is "L" when negative.

The controller circuit #2 (402) includes two digital inputs, one analog input and one analog output. The trigger signal from the trigger circuit 203 and the polarity discrimination signal from the polarity discrimination circuit 401 are input into those two digital inputs. The analog input of the controller circuit #2 (402) receives V1 from the reference-voltage source 201. The analog output of the controller circuit #2 (402) is output to the adder 113.

In an initial state (at the time an electric power source of the wavelength locking system is turned on), the analog output of the controller circuit #2 (402) is maintained at 0 (zero) V. Upon input of the trigger signal, the analog output is increased or decreased in accordance with the polarity discrimination signal. When the polarity discrimination signal is "H" (the polarity of the operation signal is positive), the analog output is increased by a predetermined amount of V1. In contrast, when the polarity discrimination signal is "L" (the polarity of the operation signal is negative), the analog output is decreased by the predetermined amount of V1. Those increases and decreases are respectively effected within a predetermined time, and the increased or decreased analog output is maintained until a next trigger signal is input.

Figure 8:
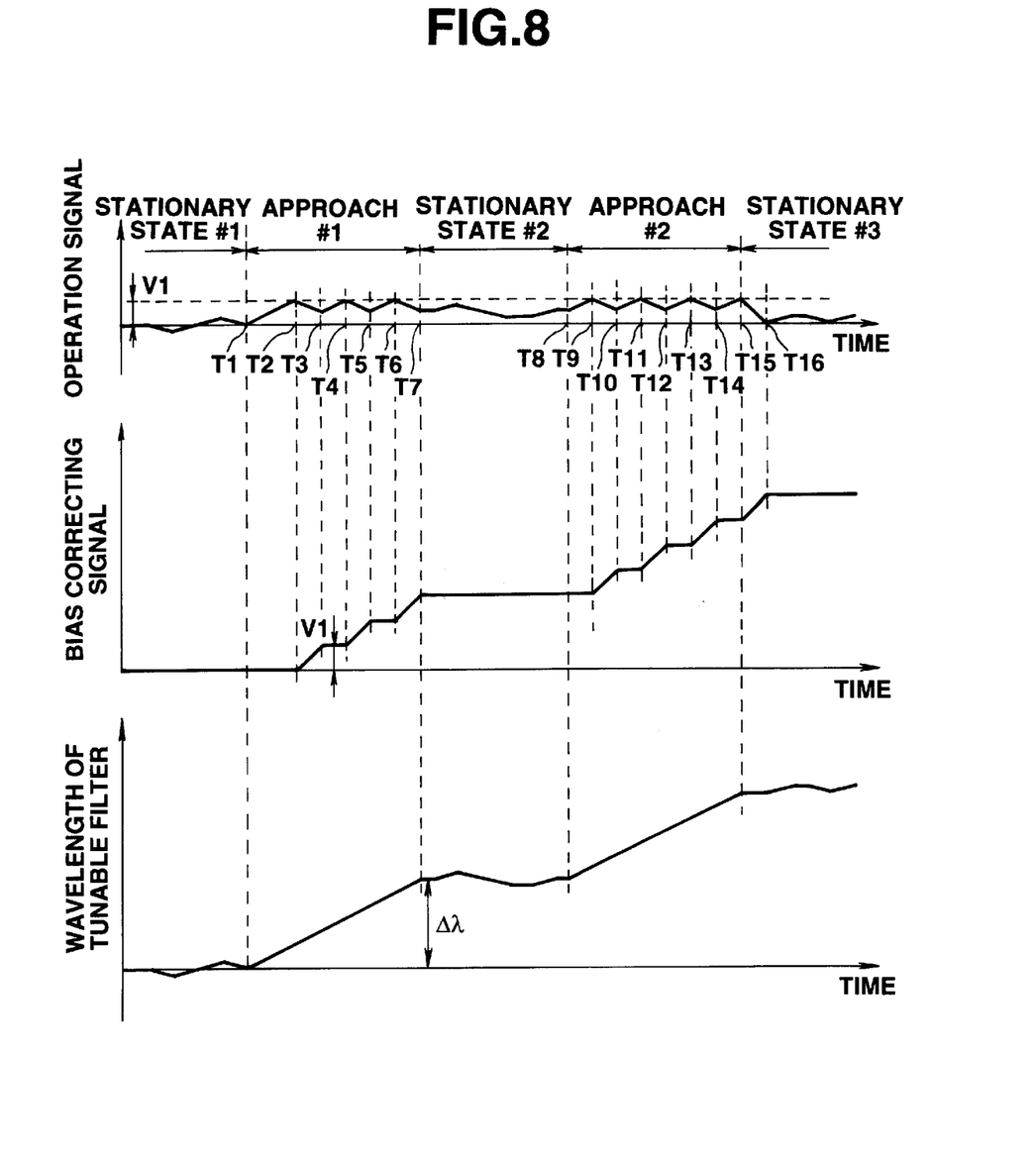
FIG. 8 is a view illustrating the wavelength control operation of the second embodiment.

FIG. 8 shows the operation of the wavelength locking system of the second embodiment. In FIG. 8, changes with time of the operation signal, the bias correcting signal and the wavelength of the tunable filter 114 are illustrated. FIG. 8 differs from FIG. 4 illustrating the operation of the wavelength locking system of the first embodiment in the manner during the approach period. One increment or decrement of the bias correcting signal is set to a fixed value V1, and the operation signal is not always reduced to 0 (zero) each time the bias correcting operation is performed. In FIG. 8, times T1, T7, T8 and T15 indicate timings at each of which the operation of the reception wavelength changes, and T2~T6 and T9~T15 indicate timings of the bias correcting operation.

The bias correcting operation of the second embodiment will be described with reference to the above figures. In this embodiment, the bias correcting amount for each trigger signal is set to the fixed value V1 (positive or negative). Therefore, when the reception wavelength is shifted during the bias correcting operation (the period from T2 to T3 in FIG. 8, for example), the operation signal is not corrected by a variant amount corresponding to the shift amount of the reception wavelength. As a result, even after the bias correcting operation (T3 in FIG. 8, for example), the operation signal is not always reduced to 0 (zero). Where there occurs no shift of the reception wavelength after the start of the bias correcting operation (the period from T15 to T16 in FIG. 8), the operation signal after the bias correcting operation is lowered to 0 (zero).

When a variance amount (V1 is an amount thereof for the above predetermined time) of the bias correcting signal during the bias correcting operation is set larger than a variance amount of the operation signal for the predetermined time due to a large wavelength shift of the reception wavelength, the absolute value of the operation signal can be maintained below V1 by the above system.

Since the bias correcting operation is performed by the bias correcting circuit 111 provided in the wavelength locking control system in the second embodiment, similarly to the first embodiment, no large burden is given to the wavelength control system for controlling the entire system. In the second embodiment, the process by the controller circuit #2 (402) in the bias correcting circuit 111 is not performed by increasing or decreasing the bias correcting signal while monitoring the operation signal such that the absolute value of the operation signal is lowered to 0 (zero), but only performed by making a bias correction of the fixed value V1 (positive or negative) for each trigger signal from the trigger circuit 203. Therefore, the controller circuit #2 (402) of the second embodiment is simpler than the controller circuit #1 (204) of the first embodiment. With respect to the other points, the second embodiment is the same as the first embodiment.

Third Embodiment

A third embodiment will be described with reference to FIG. 9. In the third embodiment, the wavelength control system for controlling the wavelength locking system also performs the bias correcting operation based on the operation signal from the wavelength locking control system. The operation of the third embodiment is the same as that of the first embodiment or the second embodiment, so the description of the operation is omitted and only the structure will be described.

Figure 9:
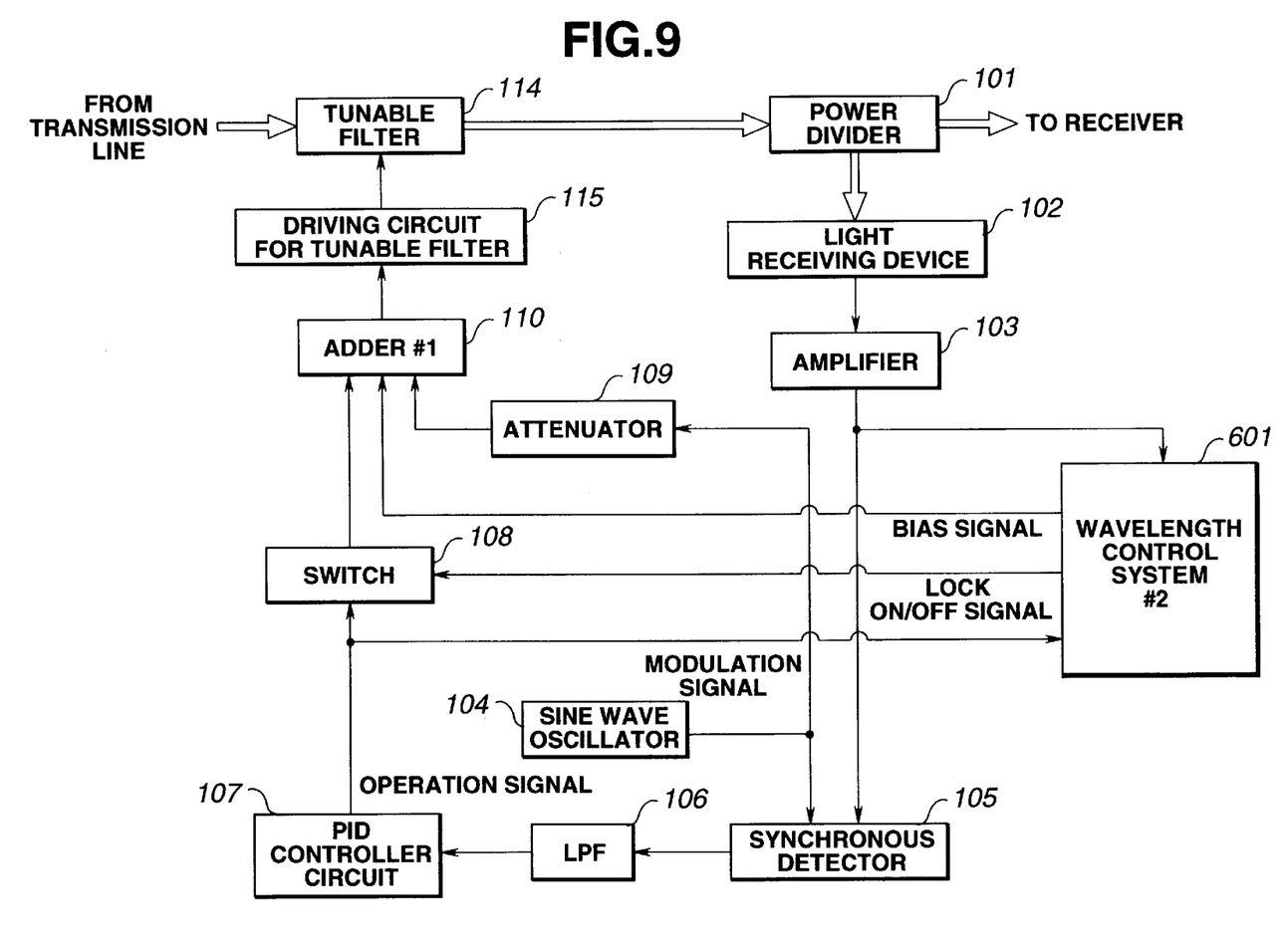
FIG. 9 is a view illustrating the structure of a third embodiment of a wavelength locking system according to the present invention.

FIG. 9 illustrates the structure of a wavelength locking system of this embodiment. FIG. 9 differs from FIG. 4 of the first embodiment in that the third embodiment lacks the bias correcting circuit 111, the switch 112 and the adder #1 (113) and that the operation signal from the PID controller circuit 107 is input into a wavelength control system #2 (601) outside of the wavelength locking system.

In the wavelength control system #2 (601), an analog input for receiving the operation signal is added to the wavelength control system #1 (116) in the first embodiment. The wavelength control system #2 (601) performs the bias correcting operation as well as the above work to be executed as the wavelength control system, by a microprocessor in the wavelength control system #2 (601). A maximum value V1 of the operation signal is stored in the microprocessor, and the bias correction is performed by changing the bias signal itself output from the wavelength control system #2 (601).

With respect to the other structural elements, the third embodiment is the same as the first embodiment. In this embodiment, though the wavelength control system #2 (601) is somewhat complicated, no additional structural elements are needed in the wavelength locking system.

Fourth Embodiment

A fourth embodiment is directed to a wavelength division multiplexing communication network using the wavelength locking system of the present invention as a receiver system. In the above-discussed conventional wavelength division multiplexing communication network, the wavelength spacing between channels and the speed of the wavelegth shift (a change amount of the wavelength per unit time) during the approach period or the like are important factors.

According the wavelength locking system of the present invention, the system can permit a large wavelength shift without degrading the locking performances (such as control accuracy or precision and response time). The locking control precision is one of factors which determine the wavelength spacing and the signal transmission speed per one wavelength, and the response time is one of factors which determine the speed of the wavelength shift. When the wavelength locking system of the present invention is used in the receiver system of the wavelength division multiplexing communication network, the wavelength spacing can be narrowed and the wavelength shift speed can be increased. Accordingly, the density of wavelength multiplexing can be increased, the signal transmission speed can be made fast, the time required for allowing another terminal to start transmission after one terminal starts the transmission can be shortened, and so forth.

Other Embodiments

Although the FFP is used as the wavelength tunable filter in the above embodiments, a single-electrode or multi-electrode filter having a DFB or DBR semiconductor laser structure can be used as the tunable filter. In this case, a signal for controlling the operation condition of the tunable filter supplied from the filter driving circuit, which is controlled by the operation signal, is injected into at least a portion of the waveguide of the filter as a current signal, so that the above-discussed wavelength locking control can be executed.

Further, the tunable filter may include a temperature controller (such as a Peltier element using a exothermic or endothermic phenomenon upon current injection), or may use a DBR-LD with its wavelength control region having a heater electrode (see "Heaters On Passive Region Employed (HOPE) DBR-LD", Lecture No. P4-171, Electronics Information Communication Association of Japan, 1992 Autumnal Meeting, for example). In this case, a signal from the filter driving circuit is supplied to the temperature controller or the heater electrode, so that the temperature of the filter is controlled and the transmission wavelength thereof is thus locked in the reception wavelength. Furthermore, considering the response characteristic of the filter, the control signal corresponding to the operation signal may be supplied as a current signal to the filter through its electrode (the control signal corresponding to the modulation signal may also be similarly supplied as a current signal) and the corrected bias signal may be supplied to the temperature controller or the like as a control signal, or vice versa.

Further, the two examples illustrated in FIGS. 5 and 7 are used as the bias correcting circuit in the above embodiments, but any other structure may be used so long as it can adjust its output such that the absolute value of the operation signal input into the filter driving circuit is suppressed below a predetermined value.

Further, the bias correcting operation is performed until the absolute value of the operation signal reaches 0 (zero) in the first embodiment, but the bias correcting operation may be finished when this absolute value reaches an appropriate value below V1.

Similarly, the absolute value of a change amount of the bias correcting signal per each bias correcting operation is set to V1 in the second embodiment, but the bias correcting operation may be finished when this absolute value reaches an appropriate value below V1.

Further, the structure illustrated in FIG. 4 is described as a structural example of the wavelength locking system, but any other structure may be used only if such a structure can detect the absolute value of the operation signal and has a function for suppressing this value below a predetermined value. For example, the positional relationship between the bias correcting circuit 111 and the switch may be inverted. Furthermore, the adder #1 (110) and the adder #2 (113) may be combined into a unit.

Further, the sine wave is used as the modulation signal for the wavelength locking, but any other signal with phase information may be used. For example, a square wave may be used.

As the wavelength locking system, there is described the system in which the minute modulation and the synchronous detection are used, but other systems may be used. For example, a wavelength locking system may be used in which is arranged two tunable filters each controlled such that a wavelength difference between its wavelength and the wavelength of the object tunable filter, to which the wavelength locking control is applied, is equal to a predetermined value (one filter is on a shorter wavelength side, the other is on a longer wavelength side, and the wavelength difference is ordinarily about equal to a half width of the transmission spectrum of the object tunable filter), and the absolute value of the operation signal is controlled such that a difference signal between intensities of transmission light through those two tunable filters is maintained at 0 (zero). Thus, the wavelength of the object tunable filter is automatically caused to track the reception wavelength.

Further, as a system for distributing information of light transmitted through the tunable filter to the wavelength locking system, the system for performing the distribution at a level of an optical signal by using the power divider is described, but the distribution may be executed at a level of an electric signal produced from the optical signal.

Further, as the wavelength control system of the optical transmitter in the wavelength division multiplexing communication network, there is above described the system in which wavelengths of the respective transmitters are placed at a predetermined wavelength spacing $\Delta \lambda$ on the longer wavelength side (or the shorter wavelength side) in the order of the start of transmission, but it is possible to use another wavelength control system in which after the optical receiver locks the wavelength of the tunable filter in the reception wavelength transmitted from the transmitter, the reception wavelength largely shifts according to fluctuation of the transmission wavelength on the transmitter side, for example.

As described in the foregoing, according to the present invention, the system can cope with a large wavelength shift of the reception wavelength without degrading performance of the wavelength locking, and a wavelength division wavelength multiplexing network with a large number of multiplexed wavelengths can be readily constructed, for example.

Except as otherwise disclosed herein, the various components shown in outline or block form in any of the FIGS. 1–9 are individually well known in the optical semiconductor device, driving method therefor and optical communication arts, and accordingly, their internal construction and operation are not described herein.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A wavelength locking method for causing a wavelength of a transmission spectrum of a tunable filter to track a wavelength of light from a light source by controlling a control signal by controlling an operation condition of the tunable filter in a feedback control system of a wavelength locking system, said method comprising the steps of:

generating an error signal relevant to a deviation of the wavelength of the tunable filter from the wavelength of the light source;

generating an operation signal for feedback control of the wavelength locking system, using the error signal;

detecting the operation signal; and correcting a bias component of the control signal based on the detected operation signal such that an absolute value of the operation signal does not exceed a predetermined value.

2. A wavelength locking method according to claim 1, further comprising the step of controlling the control signal for controlling at least one of a voltage application condition, a current injection condition, and a temperature condition of the tunable filter to cause the wavelength of the tunable filter to track the wavelength of the light source.

3. A wavelength locking method according to claim 1, said step of correcting the bias component of the control signal corrects the bias component of the control signal such that the absolute value of the operation signal is reduced to a value no more than the predetermined value when the absolute value of the operation signal reaches the predetermined value or more in said bias component correcting step.

4. A wavelength locking method according to claim 1, wherein the bias component of the control signal is one of increased and decreased by a value such that the absolute value of the operation signal is maintained at a value no more than the predetermined value when the absolute value of the operation signal reaches the predetermined value or more in said bias component correcting step.

5. A wavelength locking method according to claim 1, wherein the wavelength of the tunable filter is caused to track the wavelength of the light source by performing a minute modulation of the wavelength of the tunable filter and a synchronous detection of a modulation signal for causing the modulation of light transmitted through the tunable filter.

6. A wavelength locking apparatus for causing a wavelength of a transmission spectrum of a tunable filter to track a wavelength of light from a light source by controlling a control signal by controlling an operation condition of the tunable filter in a feedback control system, said apparatus comprising:

means for generating an error signal relevant to a deviation of the wavelength of the tunable filter from the wavelength of the light source;

means for generating an operation signal for feedback control, using the error signal;

means for detecting the operation signal; and means for correcting a bias component of the control signal based on the detected operation signal such that an absolute value of the operation signal does not exceed a predetermined value.

7. A wavelength locking apparatus according to claim 6, further comprising control means for controlling the wavelength locking apparatus, said control means including said bias component correcting means.

8. A wavelength locking apparatus according to claim 6, wherein the wavelength of the transmission spectrum of the tunable filter is caused to track the wavelength of the light source by controlling the control signal for controlling at least one of a voltage application condition, a current injection condition, and a temperature condition of the tunable filter.

9. A wavelength locking apparatus according to claim 6, wherein said bias component correcting means corrects the control signal such that the absolute value of the operation signal is reduced to a value no more than the predetermined value when the absolute value of the operation signal reaches the predetermined value or more in said bias component correcting means.

10. A wavelength locking apparatus according to claim 6, wherein the bias component of the control signal is one of increased and decreased by a value such that the absolute value of the operation signal is maintained at a value no more than the predetermined value when the absolute value of the operation signal reaches the predetermined value or more in said bias component correcting means.

11. A wavelength locking apparatus according to claim 6, further comprising means for performing a minute modulation of the wavelength of the tunable filter and a synchronous detection of a modulation signal for causing the modulation of light transmitted through the tunable filter to track the wavelength of the light source.

12. A wavelength division multiplexing communication network comprising:

an optical transmitter;

an optical receiver with a tunable filter for receiving light transmitted from the optical transmitter through a transmission medium; and wherein a wavelength of the tunable filter is caused to track a wavelength of the light from the optical transmitter by controlling a control signal by controlling an operation condition of the tunable filter in a feedback control of a wavelength locking system when the wavelength of the light from the transmitter changes during communication, and the wavelength tracking is performed by a wavelength locking method which includes the steps of:

generating an error signal relevant to a deviation of the wavelength of the tunable filter from the wavelength of the light source;

generating an operation signal for feedback control of the wavelength locking system, using the error signal;

detecting the operation signal; and correcting a bias component of the control signal based on the detected operation signal such that an absolute value of the operation signal does not exceed a predetermined value.

* * * * *

UNITED STATES PATENT AND TRADEMARK OFFICE
CERTIFICATE OF CORRECTION

PATENT NO. : 6,188,499 B1
DATED : February 13, 2001
INVENTOR(S) : Masao Majima

It is certified that error appears in the above-identified patent and that said Letters Patent is hereby corrected as shown below:

Column 6,
Line 17, "signa" should read -- signal --.

Column 14,
Line 36, "Lecture No. P 4-171," should read -- Lecture No. C-149, p. 4-171, --.

Signed and Sealed this

Fifth Day of March, 2002

*Attest:*

*Attesting Officer*

JAMES E. ROGAN
*Director of the United States Patent and Trademark Office*